Nov. 13, 1923.
C. H. VOELLMECKE
PIPE HANGER
Filed July 11, 1922
1,474,059
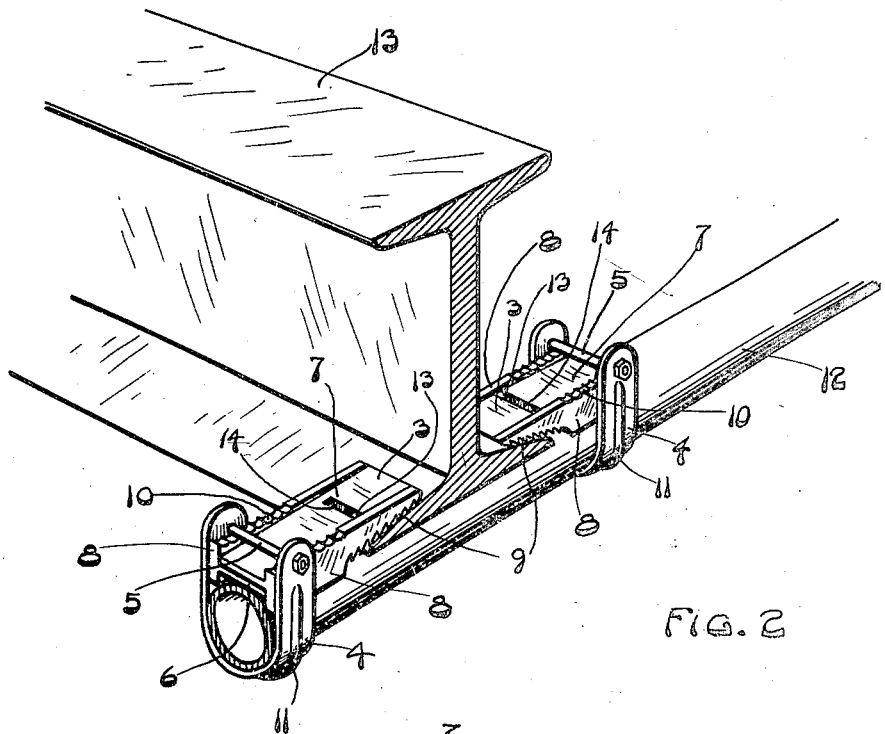
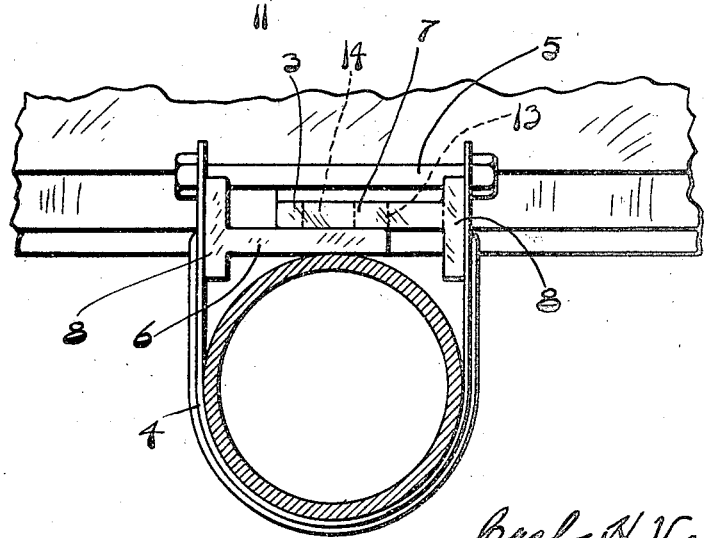
INVENTOR
Carl H. Voellmecke Patented Nov. 13, 1923.

1,474,059

UNITED STATES PATENT OFFICE.

CARL H. VOELLMECKE, OF CINCINNATI, OHIO.

PIPE HANGER.

Application filed July 11, 1922. Serial No. 574,197.

*To all whom it may concern:*

Be it known that I, CARL H. VOELLMECKE, a citizen of the United States, residing in Cincinnati, in the county of Hamilton and State of Ohio, have invented new and useful Improvements in a Pipe Hanger, of which the following is a specification.

An object of this invention is to produce an improved pipe hanger in which pipes, electric conduits, rods and the like may be quickly, securely and with little labor fastened to structural iron and steel members, such as I beams, channels, etc.

A further object is to produce an improved pipe hanger which is inexpensive to produce and which is as inexpensively attached to the pipes and its supporting structure.

These and other objects are attained in the pipe hanger described in the following specification and illustrated in the accompanying drawing in which:

Fig. 1 is a fragmental perspective view of a pair of pipe hangers embodying my invention attached to and supporting a pipe from an I beam.

Fig. 2 is a somewhat enlarged end view showing my improved pipe hanger adjusted to and supporting a pipe of large diameter.

My improved hanger consists of a wedge 3, a strap 4 and a bolt 5. The wedge is of adjustable construction and consists of two members 6 and 7 which overlap as shown and which may be readily adjusted to accommodate pipes of different sizes, a lug 13 on one member cooperating with a slot 14 on the other member to prevent longitudinal displacement of the members relatively to one another. Each member is provided with a vertical flange 8 which is tapered at one end on its under edge and is provided thereon with a series of teeth 9. The upper edge of the flange is provided with a series of notches or depressions adapted to receive the bolt 5 as shown. The strap 4 is preferably provided with a ribbed reenforcement 11 as an added feature of rigidity and strength.

In attaching the hanger I place the pipe 12 against the under face of the supporting element 13 and while supporting it there I place strap 4 around it, the bolt being put in position with the wedge beneath it, the bolt occupying the notches as shown. The wedge and strap are then slipped along the pipe until the teeth 9 engage the inclined upper face of the flange of the structural steel member. By then driving the wedge toward the member, the strap also being driven therewith, the teeth 9 grip the flange very rigidly, the strap by this operation gradually being tightened upon the pipe to draw it tightly against the under face of the member 13. Thus is displacement of the pipe prevented. I have chosen to show two hangers in position in Fig. 1, although but one is all that is actually necessary. Should the pipe be a large one the members 6 and 7 may be drawn apart as shown in Fig. 2, so as to accommodate the conditions. Furthermore, for still larger diameter pipes the members, strap and bolt would be enlarged in construction thereof.

Having thus described my invention what I claim is—:

A pipe hanger comprising in lieu thereof an adjustable wedge consisting of two transversely adjustable elements having a toothed supporting member engaging surface on the under face of each element, a notched bolt engaging surface on the upper face of each element, a pipe embracing strap, and a bolt adapted to occupy the notches of the bolt engaging surface and to retain the strap in embracing engagement with a pipe to be supported.

In witness whereof, I affix my signature in the presence of two witnesses.

CARL H. VOELLMECKE.

Witnesses.
CHARLES W. POTTER,
JOSEPH C. ORLANDO.